United States Patent
Vander Zanden

[15] 3,651,814
[45] Mar. 28, 1972

[54] SMALL SEED ATTACHMENT FOR THRESHERS

[72] Inventor: Walter J. Vander Zanden, Route 1, P.O. Box 50, Hillsboro, Oreg. 97123

[22] Filed: Dec. 3, 1970

[21] Appl. No.: 94,917

[52] U.S. Cl. ........................................................130/27 K
[51] Int. Cl. ....................................................A01f 12/28
[58] Field of Search ..........................130/27 R, 27 K, 27 L

[56] References Cited

UNITED STATES PATENTS 2,457,680  12/1948  Johnson...............................130/27 K
3,297,037  1/1967  Ausherman..........................130/27 R

FOREIGN PATENTS OR APPLICATIONS 804,490  4/1951  Germany..............................130/27 K Primary Examiner—Antonio F. Guida
Attorney—Buckhorn, Blore, Klarquist and Sparkman

[57] ABSTRACT

The attachment includes a curved plate adapted for insertion between the threshing cylinder and the concave of a thresher so as to nest within and cover the concave to prevent seeds from falling through the grate openings therein. Resilient bars bonded to the concave surface of the plate coact with the rasp bars on the cylinder to provide the threshing action.

11 Claims, 4 Drawing Figures

PATENTED MAR 28 1972 3,651,814
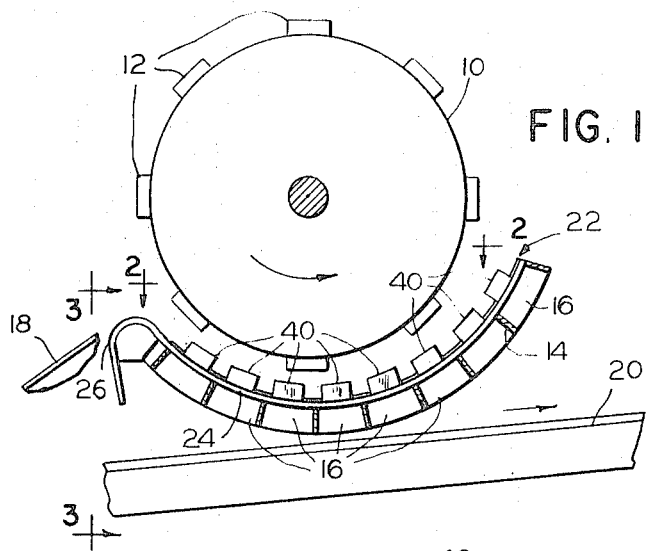
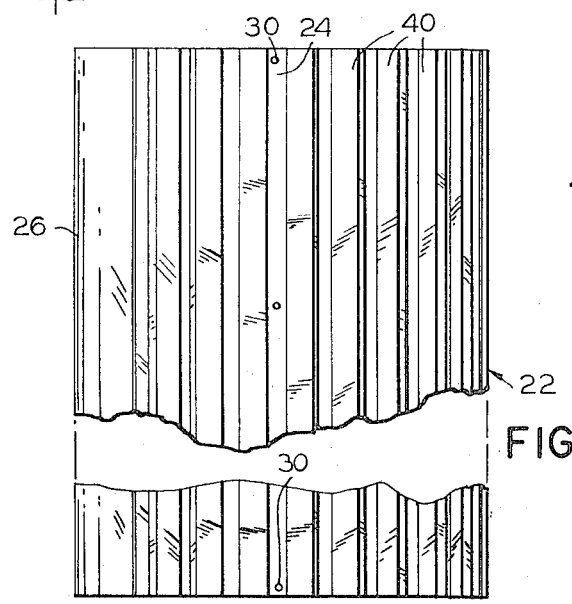
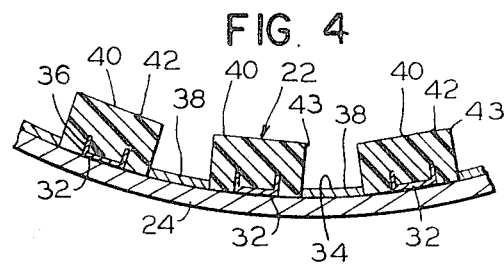
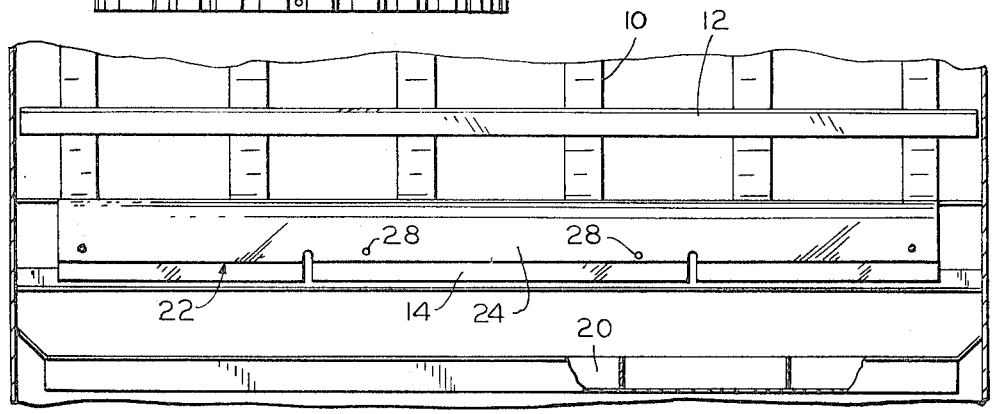
FIG. 1
FIG. 4
FIG. 2
FIG. 3
WALTER J. VANDER ZANDEN
INVENTOR
BY
BUCKHORN, BLORE, KLARQUIST & SPARKMAN
ATTORNEYS

SMALL SEED ATTACHMENT FOR THRESHERS

BACKGROUND OF THE INVENTION

1. Field of the Invention

The present invention relates to threshing machines and more particularly to an attachment to the concave of such machines to facilitate the threshing of small seeds.

2. Description of the Prior Art

The conventional open grate-like concaves of threshers are inadequate for threshing small seeds such as alfalfa and certain types of clover. The inadequate rubbing action provided by such concaves in threshing small seeds causes the seeds to fall through the concave openings to the grain table before they are completely threshed, producing an inferior product and loss of seed.

To combat this problem, some farmers have adopted the practice of bolting many individual bars to the concave so as to cover wholly or partially the many grate openings. This practice tends to prolong the threshing action by driving the small seeds from the rear end of the concave rather than through its openings.

However, the foregoing practice creates another problem in that an entire work day can be lost in installing or removing the several bars because of the large number of bars that are involved, the large number of fasteners required to attach each bar to the concave, and the difficulty of access to the concave. As a result, many farmers do not follow this practice, and their small seed crops suffer as a consequence. Other farmers who do follow this practice lose valuable and often critical harvesting time.

SUMMARY OF THE INVENTION

According to the present invention a single, unitary curved cover plate is inserted between the threshing cylinder and concave, nested within the concave and bolted to it at a relatively few accessible points to completely cover the concave grate openings. Resilient bars bonded to the plate cooperate with the cylinder to provide the threshing action. The bars of the cover plate have a longer useful life than the prior individual bars bolted directly to the concave, because no external fasteners are required to bond the former bars to the cover plate. The cover plate can be installed or removed in less than one hour.

BRIEF DESCRIPTION OF THE DRAWINGS

The foregoing and other objects and advantages will become more apparent from the following detailed description which proceeds with reference to the accompanying drawings wherein:

FIG. 1 is a side view of a threshing portion of a typical combine showing the attachment of the invention partly in section in its operative position;

FIG. 2 is a top plan view of the attachment of FIG. 1;

FIG. 3 is a frontal view taken along the line 3—3 of FIG. 1; and

FIG. 4 is a fragmentary sectional view taken along the line 4—4 of FIG. 3.

DETAILED DESCRIPTION

Referring to the drawing, FIG. 1 shows schematically the threshing portion of a combine including a threshing cylinder 10 having a series of rasp bars 12 which normally coact with a concave 14 having grate-like openings 16. When the cylinder is rotated in the direction indicated by the arrow in FIG. 1, grain fed between the cylinder and concave by infeed conveyor means 18 from the forward end of the machine is threshed to separate the grain seed from the chaff or stalks. The seeds then fall through the concave openings 16 onto a grain table 20 for further processing as the stalks are carried rearwardly over the upper side of the concave to additional conveying means.

In order to intensify and prolong the threshing action in threshing small grain seeds, a small seed threshing attachment 22 is inserted between the concave and the cylinder. The attachment includes a thin, solid steel, curved cover plate 24 which completely covers the grate openings 16 of the concave and which is curved from its forward end to its rear end to nest against the upper side of the concave. Plate member 24 has a reversibly curved forward end portion 26 designed to hook over a correspondingly curved leading end of concave 14. Openings 28 are provided at intervals along the length of the reversely curved hook portion 26 at positions corresponding to similar bolt openings in the concave itself for attaching the plate to the concave. Additional bolt openings 30 may be provided at an intermediate portion of the plate to provide additional points of attachment of the plate to the concave.

A series of flanged strips 32 of channel cross section are affixed as by welding to concave surface 34 of the cover plate in parallel relationship and at laterally spaced-apart intervals from the forward to the rear end of such plate. Such strips extend from side to side of the cover plate and have their flanges 36 directed outwardly toward the center of curvature of the plate. Thin spacer strips 38 are also bonded to the cylinder-confronting concave surface of the cover plate between channel strips 32.

A series of resilient plastic or rubber threshing bars 40 is molded in place over the channel strips and between spacers 38 to bond the bars to the cover plate, without requiring any external fastener devices. It has been found that threshing bars made of a resilient plastic material having a hardness of approximately 65 to 70 provide a long and useful life without damaging the small and sometimes fragile seeds.

All of threshing bars 40 are preferably of similar rectangular cross section and project to a uniform extent outwardly of the concave surface of the cover plate, well beyond the spacers 38. They project in a direction toward the center of curvature of the concave plate portion thereby presenting a flat outer cylinder-confronting surface 42 but with sharp edges 43 to the rasp bars 12 of cylinder 10.

Ideally the threshing bars 40 extend throughout the width of the cover plate, that is, from side to side of such plate, and also are provided throughout the length of the concave surface portion of such plate.

The cover plate itself is sized so that it more or less completely covers the concave and at least all of its openings.

OPERATION

With the cover plate in place as shown in FIG. 1, rotation of the cylinder causes material fed between the cylinder and the forward end of the cover plate to be threshed or rubbed between the rasp bars of the cylinder and the resilient bars 40 of the cover plate to separate the seeds and stalks as they progress rearwardly together along the upper side of the cover plate. Eventually the seeds fall from the rear end of the cover plate onto grain table 20 below. At the same time the stalks continue their rearward travel from the cover plate onto an open grate continuation of the concave, whereby separation of the seeds from the stalks results.

Having described what is presently a preferred form of the invention, it will be appreciated by those skilled in the art that the same permits of modification in arrangement and detail. My intention is to claim as my invention all such modifications as come within the true spirit and scope of the following claims to the broadest possible extent permitted by the prior art.

I claim:

1. A small seed threshing attachment for a threshing machine having a cooperative cylinder and concave, said attachment comprising:

a curved cover plate member adapted to fit between said cylinder and concave in covering and nesting relationship with the upper side of said concave, a series of laterally spaced-apart parallel threshing bars attached to a concave cylinder-confronting surface portion of said cover plate member and projecting outwardly from said surface toward the center of curvature thereof, said cover plate member and threshing bars defining an imperforate cover for said concave which in its operative position prevents grain seeds from falling through said concave and causes said seeds to be conveyed rearwardly beyond the rearward end of said concave, said cover plate member including means for removably securing said member to said concave.

2. An attachment according to claim 1 wherein said bars are made of a resilient material.

3. An attachment according to claim 1 wherein said bars are made of a resilient material and are bonded to said plate member.

4. An attachment according to claim 1 wherein said bars are resilient and molded in place over upward projections from the concave surface of said plate member to bond said bars to said member.

5. An attachment according to claim 1 wherein said plate member has a smooth continuous concave surface portion and said bars are attached to said concave surface portion.

6. An attachment according to claim 1 wherein said bars are of similar rectangular cross-sectional shape and have flat top surfaces directed toward said center of curvature.

7. An attachment according to claim 1 wherein said plate member includes a reversely curved forward end portion for cooperative engagement with the leading end of said concave.

8. An attachment according to claim 1 including a series of flanged strips affixed in spaced relation to the concave surface of said plate member in positions corresponding to the positions of said bars and with their flanged portions projecting outwardly from said surface toward said center of curvature, said threshing bars being made of a resilient material molded about said flanged portions to anchor said bars to said plate member.

9. An attachment according to claim 8 including spacer strips affixed to the concave surface of said plate member between said bars, said bars projecting outwardly from said plate member beyond said spacer strips.

10. A small seed threshing attachment for covering the concave of a threshing machine including an imperforate cover plate member curved in a direction from its forward end toward its rear end and having a continuous uniformly curved concave surface portion with a plurality of laterally spaced-apart parallel resilient threshing bars each affixed to and extending continuously across the width of said concave surface portion and projecting from said concavely curved surface toward the center of curvature thereof.

11. A small seed threshing attachment for the concave of a threshing machine characterized by a curved cover plate which nests within the concavely curved side of said concave and completely covers the openings through said concave to prevent seeds from falling through said openings, and a series of resilient threshing means projecting from a concave surface of said cover plate for threshing cooperation with a threshing cylinder of said machine.

* * * * *